Feb. 16, 1932.  J. H. GLEASON  1,845,745
MEANS FOR CONTROLLING THE COMMENCEMENT OF OPERATIONS
OF A PLURALITY OF WATER GAS SETS
Filed April 30, 1928  5 Sheets-Sheet 1
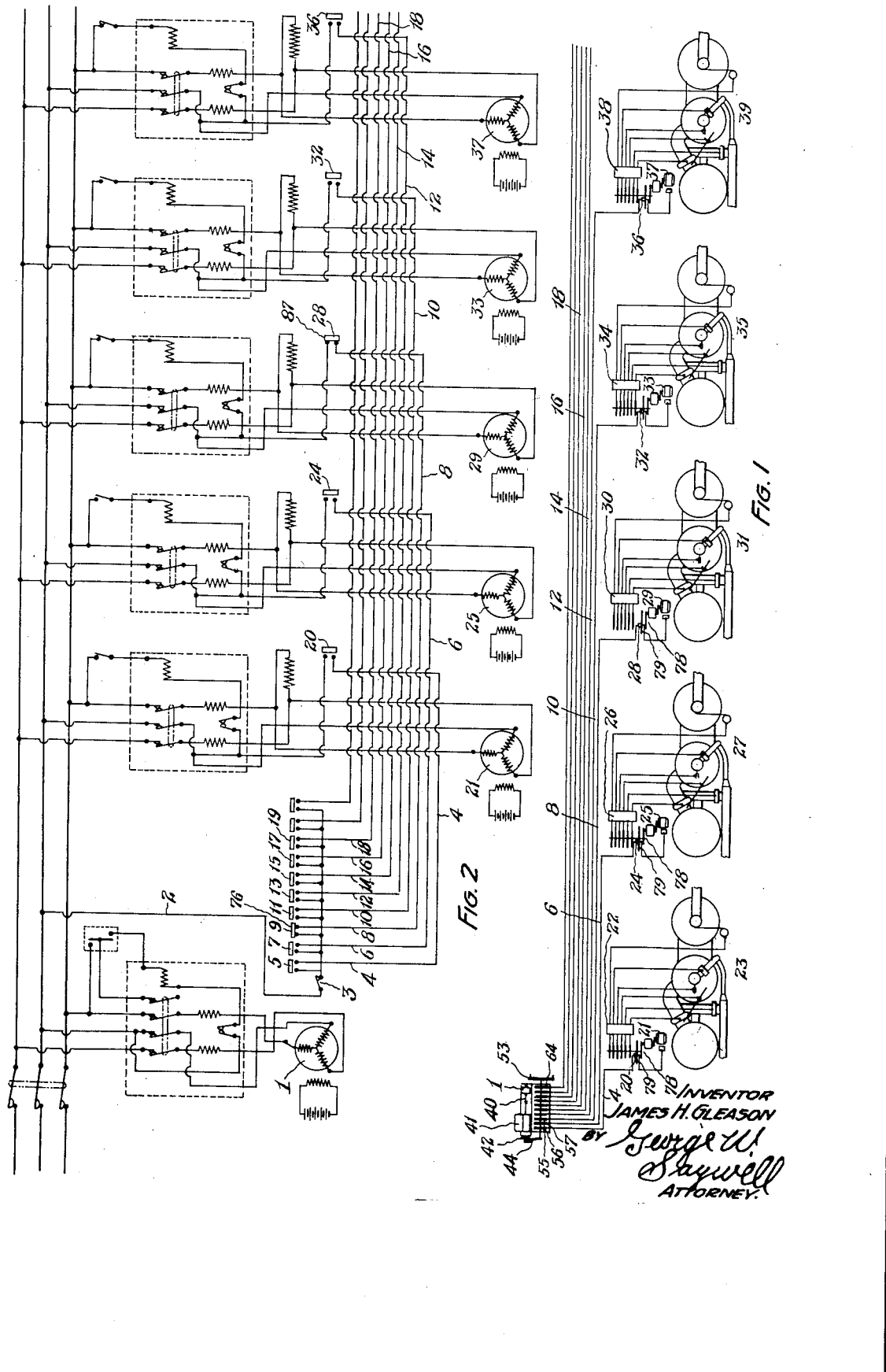

INVENTOR:
JAMES H. GLEASON
BY George W. Sayvell
ATTORNEY.

Feb. 16, 1932.　　　J. H. GLEASON　　　1,845,745
MEANS FOR CONTROLLING THE COMMENCEMENT OF OPERATIONS
OF A PLURALITY OF WATER GAS SETS
Filed April 30, 1928　　5 Sheets-Sheet 4
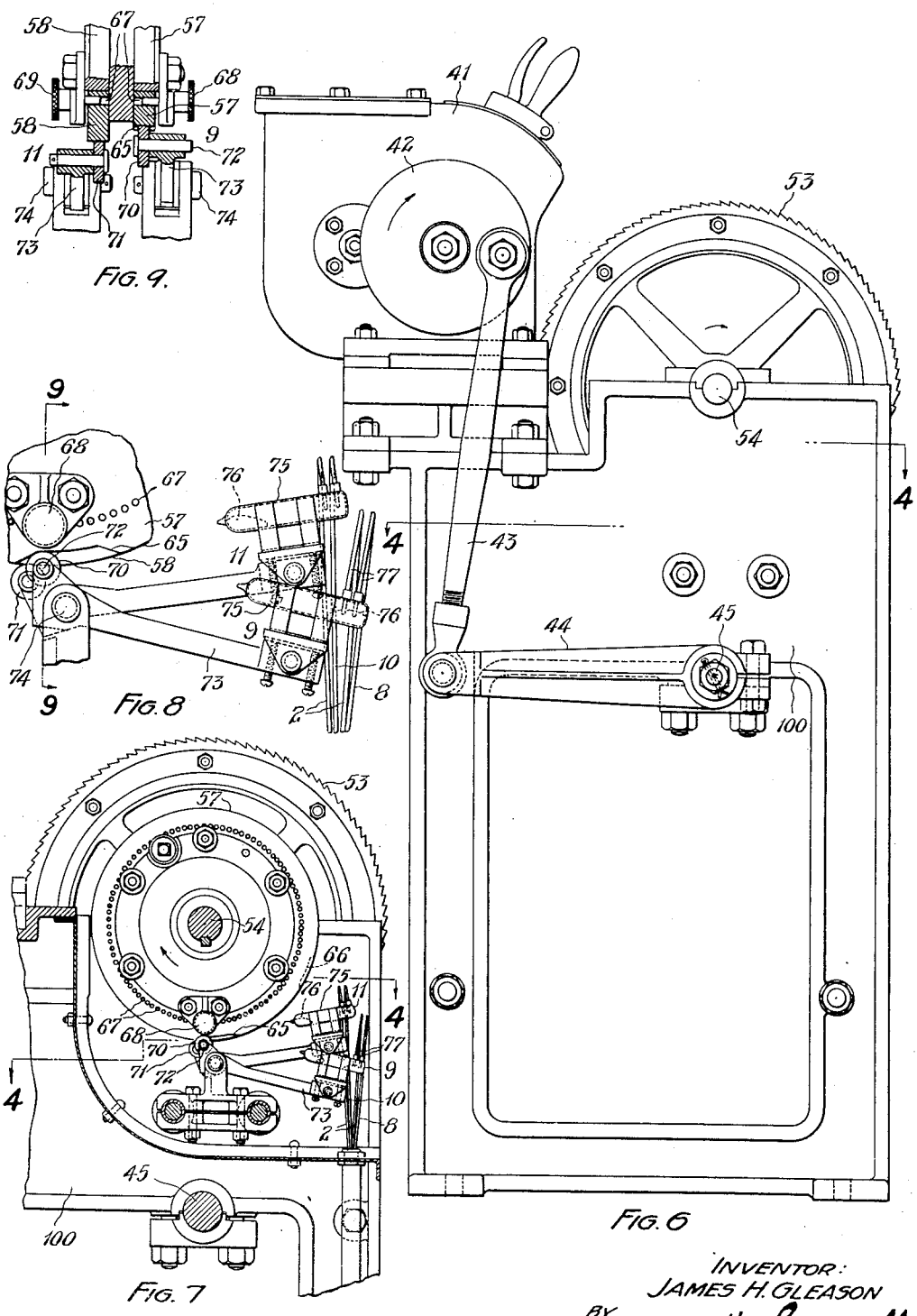
INVENTOR:
JAMES H. GLEASON
BY George W. Saywell
ATTORNEY.

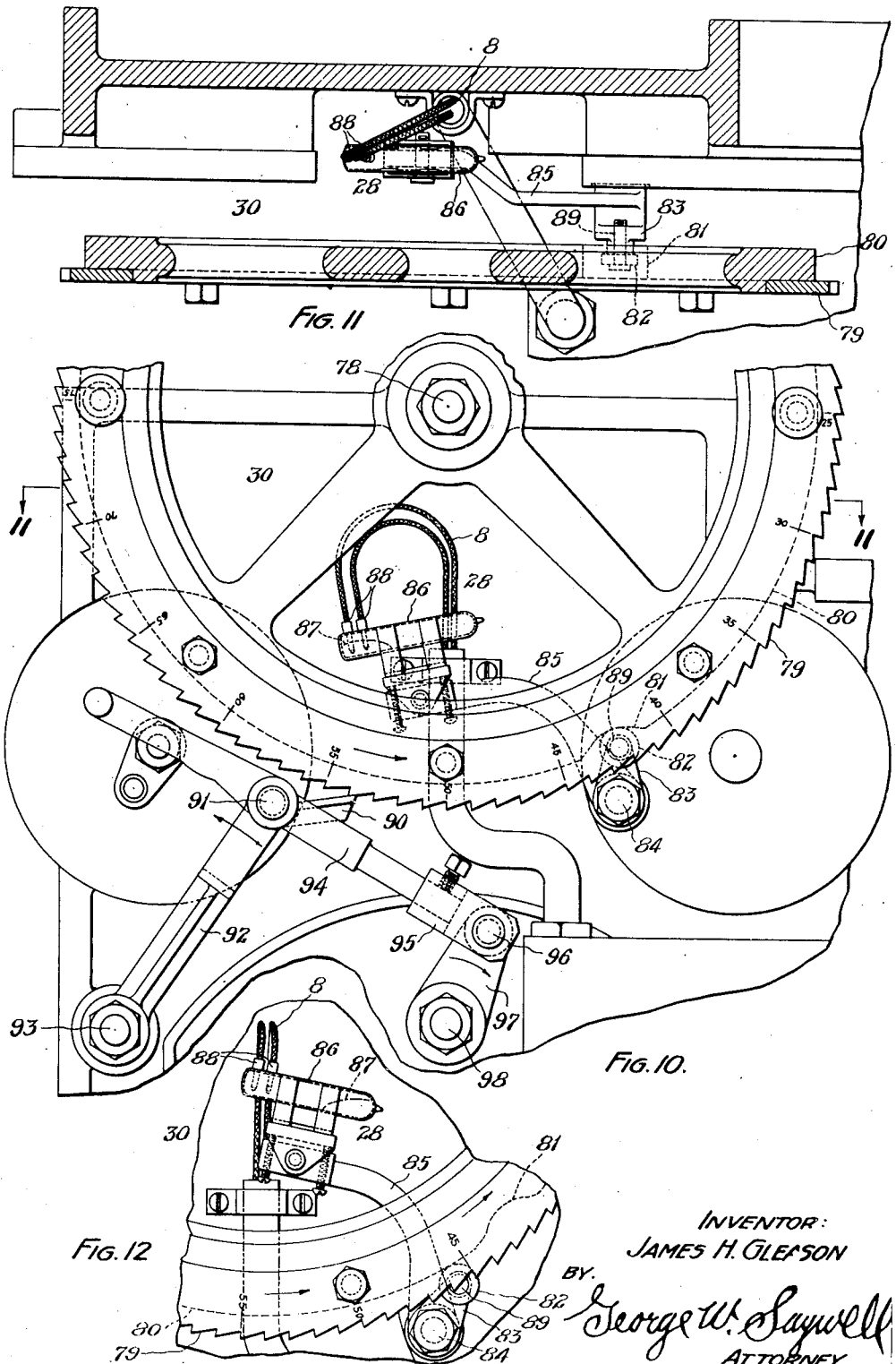

Patented Feb. 16, 1932

1,845,745

UNITED STATES PATENT OFFICE

JAMES H. GLEASON, OF WILLOUGHBY, OHIO

MEANS FOR CONTROLLING THE COMMENCEMENT OF OPERATIONS OF A PLURALITY OF WATER GAS SETS

Application filed April 30, 1928. Serial No. 273,916.

The invention particularly relates to apparatus of this character adapted automatically to insure a predetermined timed sequence of the commencement of operations of a plurality of water gas sets, whereby similar operations in different sets will occur at different times; and also to insure that each set will be in a desired position before it is put in operation. This desired position will preferably be the position at the beginning of a given cycle of gas set operations known as the zero position. These results are effected by a certain arrangement of electrical and mechanical controlling means hereinafter fully described.

It is well known that when a plurality of water gas sets are in simultaneous operation for the same duty it is advisable to arrange the blasting, steaming, and make-gas periods, etc., so as to cause these periods to occur at different times for different sets, whereby a more or less uniform use of blasting air, steam, etc., is effected, and whereby a more or less uniform discharge of made-gas follows. Certain of the improvements herein described and claimed relate to means for effecting this uniformity of operation. It is also well known that it is desirable to start the operation of any one water gas set at a given point in its cycle of operations, i. e., all the valves and other controlling means should be in a certain preferred position for the sake of certainty and safety of operation. Other features of the improvements herein described and claimed relate to means for effecting this last-described purpose. I shall hereinafter refer to the means for effecting the serial operation of the different sets as "motor timer", and the means for effecting the starting of any one set at a given desired point as "zero-setting means" for the usual automatic control of the valve-operating mechanisms.

The annexed drawings and the following description set forth in detail certain means exemplifying my invention, such disclosed means constituting, however, but one of the forms in which the principle of the invention may be embodied.

In said annexed drawings:

Figure 1 is a diagrammatic plan view showing the relative arrangement of my improved motor timer and zero-setting means for five water gas sets, electrical circuits for five additional sets being suggested;

Figure 2 is an electrical wiring diagram of my improved motor timer and zero-setting means and their connections;

Figure 6 is an elevation of the left side of the motor timer;

Figure 7 is a fragmentary vertical cross-section, taken in the plane indicated by the line 7—7, Figures 3 and 4;

Figure 8 is a view upon an enlarged scale of a portion of Figure 7;

Figure 9 is a fragmentary vertical cross-section, taken in the plane indicated by the line 9—9, Figure 8;

Figure 10 is a fragmentary elevation of a portion of one of the zero-setting mechanisms for insuring the starting of a set at the proper position;

Figure 11 is a fragmentary plan section, taken in the plane indicated by the line 11—11, Figure 10; and Figure 12 is a view of a portion of Figure 10, certain of the elements being shown, however, in alternate positions from those shown in Figure 10.

Figure 3:
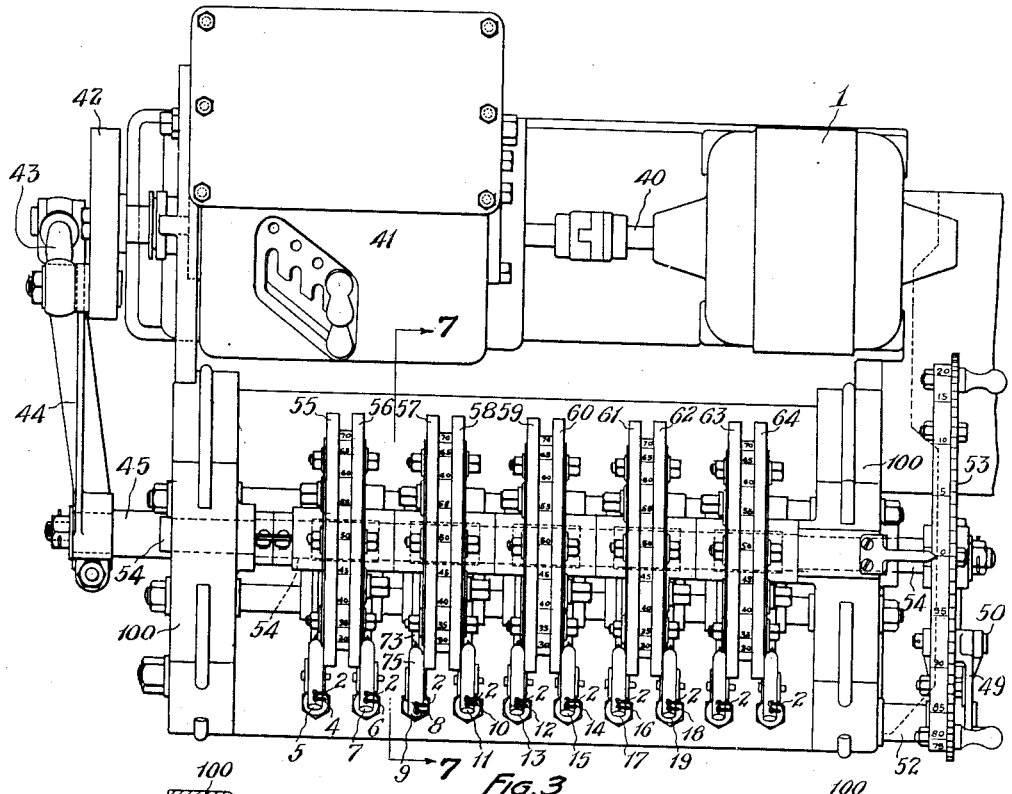
Figure 3 is a plan view, upon an enlarged scale, of the motor timer.

Referring to the annexed drawings in which the same parts are denoted by the same respective numbers in the different views, a master motor 1 is connected electrically with a main line and controlled by switches, as illustrated in the wiring diagram of Figure 2, this motor 1 preferably being a synchronous alternating current motor, although a direct current motor would well serve the purpose, if it were properly controlled to produce constant speed. Through a conductor 2 controlled by a cut-out switch 3 the current is also conducted to a series of wires 4, 6, 8, 10, 12, 14, 16, 18, etc., if and when certain switches 5, 7, 9, 11, 13, 15, 17, 19, etc., are respectively closed. These lines 4, 6, 8, 10, etc., control respective motors 21, 25, 29, 33, 37, etc., which operate respective valve governing means 22, 26, 30, 34, 38, etc., of a plurality of water gas sets 23, 27, 31, 35 and 39, etc., only five of such sets being shown in Figures 1 and 2, these figures not being completed to show diagrammatically the other five sets which would be controlled by the current traveling through the several lines 14, 16, 18, etc. The number of sets is immaterial, ten being suggested for purposes of illustration.

The circuits are not actually completed through the switches 5, 7, 9, etc., and the conductors 4, 6, 8, 10 and 12 to the motors 21, 25, 29, 33 and 37 unless a plurality of other switches 20, 24, 28, 32 and 36 are respectively closed, but the reason for such construction and the means for controlling and closing these switches 20, 24, 28, 32 and 36 will be fully described hereinafter. For the present, the description will be limited to the means whereby the several switches 5, 7, 9, etc., of the first set of switches are controlled and actuated so that, if respectively closed, the current will be conducted to the motors 21, 25, 29, etc., assuming that the second set of switches 20, 24, 28, 32, 36, etc., are closed. The construction is such that the switches 5, 7, 9, etc., will be closed in any desired sequence, thus setting into operation the motors 21, 25, 29, 33 and 37, etc., in the same sequence. The purpose is that thus the several functions incident to the operation of, and offtakes from, a plurality of water gas sets may be equalized. It is apparent that if the motors 21, 25, 29, etc., which control the several functions of the different sets 23, 27, 31, etc., are put into operation at different times and if the periods for a cycle of operations of each of the several sets are equal, the blasting of the several sets, the steaming thereof, the make-gas periods thereof, etc., will be distributed so as to require a more or less equalized supply of air, steam, etc., and effect a more or less equalized production of gas for the several sets entering into these operations. I shall now describe the detailed means for effecting the closing in sequence of the several switches 5, 7, 9, etc. In this description and as shown in the accompanying drawings, these switches are of the mercury type but any other suitable type would serve the purpose, the mercury type seeming well to comply with the demands and being convenient of illustration to show the operation effected and the results desired.

Figure 4:
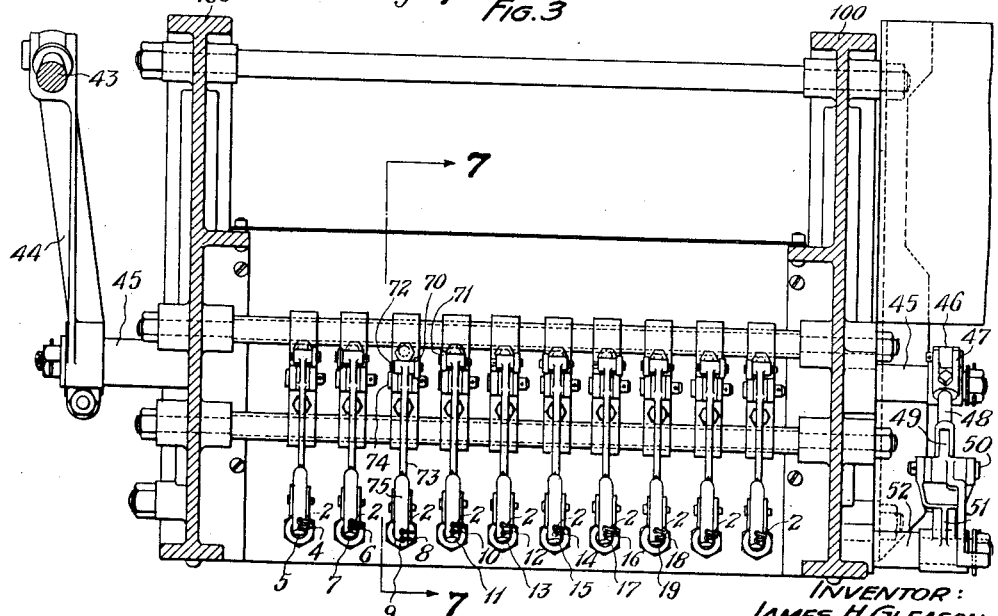
Figure 4 is a plan sectional view of the motor timer, taken in the planes indicated by the line 4—4, Figures 5, 6 and 7.
Figure 5:
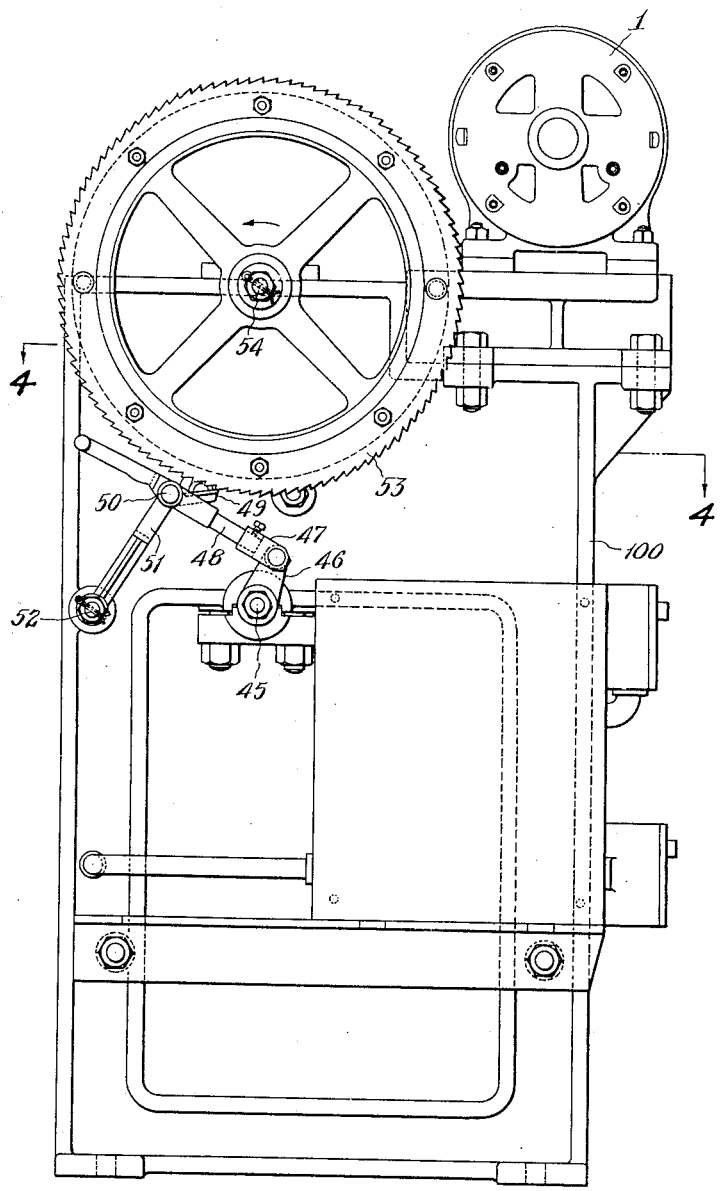
Figure 5 is an elevation of the right side of the motor timer, as seen in Figure 3.

Referring particularly to Figures 3 to 9, it will be noted that the shaft 40 of the main motor 1 actuates a disk 42 through a suitable change gear and speed reducing box 41, there being eccentrically secured to this disk 42 a connecting rod 43 pivotally connected at its outer end to a rocker arm 44 which in turn at its other end is secured to a shaft 45 mounted in a frame 100. To the opposite end of this shaft 45 is secured an arm 46, serving as a rock lever by reason of the oscillations to which the shaft 45 is subjected, this arm 46 being pivotally connected to one end of a socket member 47 within which is secured a link 48 pivotally secured intermediate of its ends to a pin or stud 50 on which is mounted a counterweighted pawl 49. A link 51 is pivotally mounted at one end on the pin 50 and is pivotally mounted at the other end upon a stud 52 mounted in the frame 100. This pawl 49 periodically actuates a ratchet wheel 53 secured to a shaft 54 also mounted in the casing 100. A plurality of disks 55, 56, 57, 58, 59, 60, 61, 62, 63 and 64, one for controlling each of the motors 21, 25, 29, 33, 37, etc., are also fixedly mounted on the shaft 54. These disks are severally formed with angularly spaced peripheral notches 65, 66, etc., one notch for each disk, of which only notch 65 upon disk 57 and notch 66 upon disk 58 are shown, Figure 7. Each disk is also formed with a ring of indexing holes 67 adapted to be detachably engaged by pins 68, 69, etc., Figure 9, mounted for fixed rotation with the shaft 54, whereby it is evident that each of the several disks 55, 56, 57, etc., can be set in any one of a large number of positions, within the range of its entire circumference, before the disks are all rotatably connected together upon the shaft 54. It is evident that thus the several disks can be set in any desired relatively angular arrangement, insofar as the several positions of the notches 65, 66, etc., are concerned. The mercury switches 5, 7, 9, etc., are arranged adjacent the several disks 55, 56, 57, etc., and through instrumentalities now to be described are designed by the aid of the notches 65, 66, etc., to close the several circuits to the motors 21, 25, 29, etc., through the conductors 4, 6, etc. The switch frame 73 of the mercury switch 9, for instance, Figures 7, 8, and 9, is pivotally mounted intermediate of its ends upon a pin 74, this mounting being such as to cause the frame 73 by reason of its own weight to tend to take the operative position shown in Figure 7. This is the position in which a globule of mercury 76, one of which globules is also shown in Figure 7 in normal or inoperative position with reference to the disk 58 next adjacent to the disk 57, such mercury 76 being contained within the contact tube 75, assumes its contacting position with the conductor 77 to close the circuit controlled by the mercury switch 9. A pin 72 is mounted in one end of the switch frame 73 and forms a journal for a roller 70 adapted to run in contact with the periphery of the disk 57. Such a roller 71 for the disk 58 is also shown in Figure 9. The switch frame 73 cannot assume the closing position of the switch 9 until the roller 70 drops into the notch 65 which action does not take place until the disk 57 has rotated to that position where it is desired that the circuit controlled by the switch 9 should be completed in order that the motor 29 governing the valve-operating mechanisms of water-gas set 31 may commence to function at the proper time. Thus, by reason of the several switches 5, 7, 9, etc., controlled by the action of the disk notches 65, 66, etc., and the rollers 70, 71, etc., the motors 21, 25, 29, etc., are put into operation in sequence, the circuits being such that the operation is not stopped by the movement of the rollers out of the notches of the several disks and the consequent opening of the switches 5, 7, 9, etc., as will be evident from an inspection of the wiring diagram, Figure 2, many parts of which are old and therefore need not be referred to herein in detail. The large number of holes 67 provided in each disk 55, 56, 57, etc., permit an adjustment of the position of the notches 65, 66, etc., relative to the rollers 70, 71, etc., so as to cause the motors 21, 25, 29, 33, 37, etc., to be thrown into operation at any desired one of a plurality of possible positions of the disks 55, 56, 57, etc., thus to provide for the proper sequential operation of the ten water gas sets, or only a part of the ten sets, or the addition of other sets, or for other reasons which make desirable a different sequential arrangement of the times at which the motors 21, 25, 29, etc., are permitted to commence to function.

A further control, as regards the operations of the several valve-actuating mechanisms of the water gas sets 23, 27, 31, etc., will now be described. In the preceding description it has been assumed that when the several switches 5, 7, 9, etc., were closed, the several motors 21, 25, 29, would function. However, this is true only if the other set of switches 20, 24, 28, etc., which control the several motors 21, 25, 29, etc., are closed. The reason for this last-named series of switches 20, 24, 28, etc., is that the invention contemplates the starting up of any one water gas set only if the said set is in a position considered suitable for initial operation. This most suitable position is the so-called zero position, or the beginning of a given cycle of gas set operations. In other words, the several elements of the water gas set are then in a preparatory state for the next cycle of operations. These zero positions of the several water gas sets are effected manually, by the means hereinafter described, resulting in a closed position of the several switches 20, 24, 28, etc., of the second set of switches.

Various automatic means for controlling the operation of the valves and other mechanisms of water gas sets are particularly shown, described and claimed in U. S. patents to Plantinga, No. 1,497,246, and to Cheney, Nos. 1,611,415 and 1,611,416, and it is assumed, for purposes of illustration, that the various water gas set operating means which are shown, described and claimed in said patents are used to operate and control the operations of the water gas sets 23, 27, 31, 35, 39, etc., shown in this application. However, other water gas set valve-actuating members might be used. This application comprises means for timing the motors which actuate the valve operating means of the several sets and for assuring the setting of the automatic controls of the several sets at the several zero positions before these automatic controls are caused to function. In said patent to Cheney No. 1,611,415, there is described commencing upon page 6, line 106, the zero position of the several valves of a water gas set; for instance, the carburetter blast valve, the generator steam valve, the carburetter oil valve, the lower hot gas valve, and the generator blast valve are all closed; whereas, the upper hot gas valve and the stack valve are open. This well serves for purposes of illustration as the beginning of a given cycle of water gas set operations, or as a zero position, at which it is desired the automatic controls of the water gas sets should be placed before the motors 21, 25, 29, etc., shall function, which furnish the power for the valve operating means. The several switches 20, 24, 28, and the coordinated elements insure this result. These also, for purposes of illustration, are shown as mercury switches. How they insure the setting of the several water gas sets at zero, before the valve-actuating means are permitted to operate, will now be described in detail.

Referring particularly to Figures 10, 11 and 12, it will be noted that upon a shaft 78 is secured a ratchet wheel 79. This is a ratchet wheel similar to that shown in said Plantinga Patent No. 1,497,246, ratchet wheel 54 of Figure 3 of said patent, for instance, and is turned by mechanism actuated by the motor 29 and similar to well known mechanism for this purpose such as shown and described in said Plantinga patent. To the shaft 78 are secured a plurality of disks and their associated elements (not shown), similar to the disks 60 of said Plantinga Patent No. 1,497,246, which control the operation of the actuating members for the several valves of a water gas set. I shall now described means for actuating the ratchet wheel 79. Engaging this ratchet wheel 79 is a counterweighted pawl 90 pivotally mounted on a pin 91 supported on a link 92 which in turn is pivotally mounted on a stud 93 fixed in the frame of the valve governing means. The link 92 is rocked on the stud 93, as indicated by double arrow, through the medium of a link 94 one end of which is pivotally mounted on the pin 91 and the other end of which is secured in a socket 95. A rocking lever 97 is fixed to a shaft 98 and its outer end is pivoted on a pin 96 upon which is also pivoted one end of the socket 95. The shaft 98 is rocked through the medium of mechanism (not shown), actuated by the motor 29 of the particular water gas set. When the rocking lever 97 is moved in the direction indicated by the arrow, the ratchet wheel 79 is moved one notch by the pawl 90, this action taking place during the operation of the water gas set to rotate the shaft 78 and cause the valve-governing members to function. Thus the shaft 78 and ratchet wheel 79 and their correlated elements, all of which are not shown in this application, but are plainly shown and described in said Plantinga and Cheney patents, control the proper operation in sequence of the several valves of a water gas set. Now it is designed by the improvements of this application not to permit the shaft 78 and ratchet wheel 79 to be rotated by the motor 29 until they are set in a certain position, which insures the setting in a desired position of the valve-actuating mechanisms which are controlled by this shaft and ratchet wheel and related elements. This control is effected by not permitting the motor 29 which actuates the shaft 78 and ratchet wheel 79 to function until the proper setting of the control is effected. It will be noted in Figure 11 that an annular shoulder member 80 upon the rim of the ratchet wheel 79 contacts with a roller 82 mounted upon a pin 89 which is secured in one end of an arm 83 pivotally mounted at its other end upon a pin 84. Integrally formed with the arm 83 is one end of a switch frame 85 of the switch 28 having a contact box 86 containing a globule of mercury 87 adapted to close the circuit through contact with conducting wires 88. The tendency of the frame 85 under its own weight is to assume the position shown in Figure 10. This is prevented until the roller 82, during the rotation of the wheel 79, drops into a notch 81 formed in said shoulder portion 80 of the wheel 79. When the wheel 79 is in the position in which the roller 82 drops into the notch 81, said wheel 79, and hence the shaft 78 which, as stated, controls the operation of the several valve-operating means governing the water gas set valves, are in their zero positions. Inasmuch as the conducting wires 88 are in the circuit including the motor 29, the latter cannot function until the controlling ratchet wheel 79 then is in its zero position. This zero-setting is that in which the switch 28 is closed and is established by rotating the ratchet wheel 79 by the pawl 90. It will be understood that there is one ratchet wheel 79 and related elements for each of the sets 23, 27, 31, 35, 39, etc., so that the latter are severally controlled by the several switches 20, 24, 28, etc., and are each necessarily set at their zero position if the motors controlling them can function. The proper zero setting of the several sets is usually effected manually by turning the ratchet wheels 79, shafts 78, and associated members, but the particular manner and means for doing the same form no particular part of this invention. The electrical circuits are so arranged that the movement of the roller 82 out of the notch 81 does not stop the operation of the motor 29, the roller and notch serving in connection with the switch 28 only as starting means for the motor 29 and hence of the water gas set 31.

What I claim is:

1. In means for controlling the commencement of the operations of a plurality of water gas sets having valves for regulating the operation of said water gas sets, the combination of a master motor; a plurality of adjustable sets of valve-actuating members adapted to be connected operatively with the valves of the respective water gas sets; motors severally governing the operation of said sets of valve-actuating members; means electrically connecting said governing motors, respectively, with said master motor, and including two sets of switches, one switch of each set for each governing motor; means for causing the switches of one set of switches severally to close; means for adjusting said several closing means whereby the switches will close in sequence; and means for placing the switches of the other set of switches in their several closing positions, these several closing positions of said last-named set of several switches corresponding to the several zero settings of said several sets of valve-actuating members.

2. In means for controlling the commencement of the operations of a plurality of water gas sets having valves for regulating the operation of said water gas sets, the combination of a master motor; a plurality of adjustable sets of valve-actuating members adapted to be connected operatively with the valves of the respective water gas sets; motors severally governing the operation of said sets of valve-actuating members; means electrically connecting said governing motors, respectively, with said master motor, and including two sets of switches, one switch of each set for each governing motor; means for causing the switches of one set of switches severally to close; means for adjusting said several closing means whereby the switches will close in sequence; and means for placing the switches of the other set of switches in their several closing positions, these several closing positions of said last-named set of several switches corresponding to the several zero settings of said several sets of valve-actuating members, the switches of both sets of switches being inoperative as regards any effect upon the several governing motors after the switches of said first-mentioned set have been closed and the corresponding governing motors have been energized.

3. In means for controlling the commencement of the operations of a plurality of water gas sets having valves for regulating the operation of said water gas sets, the combination of a master motor; a plurality of adjustable sets of valve-actuating members adapted to be connected operatively with the valves of the respective water gas sets; motors severally governing the operation of said sets of valve-actuating members; means electrically connecting said governing motors, respectively, with said master motor, and including two sets of switches, one switch of each set for each governing motor; a plurality of connected disks rotated by said master motor and provided, respectively, with means arranged in spaced angular relation and adapted to close the switches of one set of switches in sequence; and means for placing the switches of the other set of switches in their several closing positions, these several closing positions of said last-named set of several switches corresponding to the several zero-settings of said several sets of adjustable valve-actuating members.

4. In means for controlling the commencement of the operations of a plurality of water gas sets having valves for regulating the operation of said water gas sets, the combination of a master motor; a plurality of adjustable sets of valve-actuating members adapted to be connected operatively with the valves of the respective water gas sets; motors severally governing the operation of said sets of valve-actuating members; means electrically connecting said governing motors, respectively, with said master motor, and including two sets of switches, one switch of each set for each governing motor; a plurality of connected disks rotated by said master motor and provided, respectively, with means arranged in spaced angular relation and adapted to close the switches of one set of switches in sequence; and means for placing the switches of the other set of switches in their several closing positions, these several closing positions of said last-named set of several switches corresponding to the several zero-settings of said several sets of adjustable valve-actuating members, the switches of both sets of switches being inoperative as regards any effect upon the several governing motors after the switches of said first-mentioned set have been closed and the corresponding governing motors have been energized.

5. In means for controlling the commencement of the operations of a plurality of water gas sets having valves for regulating the operation of said water gas sets, the combination of a master motor; a plurality of manually adjustable sets of valve-actuating members adapted to be connected operatively with the valves of the respective water gas sets; motors severally governing the operation of said sets of valve-actuating members; means electrically connecting said governing motors, respectively, with said master motor, and including a switch between said master motor and each governing motor; and means for causing said switches severally to close, the closing of the several switches being determined by the adjustments of the several sets of valve-actuating members, said switches thereafter being inoperative as regards any effect upon the several governing motors.

6. In means for controlling the commencement of the operations of a plurality of water gas sets having valves for regulating the operation of said water gas sets, the combination of a master motor; a plurality of sets of valve-actuating members adapted to be connected operatively with the valves of the respective water gas sets, each set of valve-actuating members having a common manually adjustable shaft; motors severally governing the rotation of said shafts and hence the operation of the respective sets of valve-actuating members; means electrically connecting said governing motors, respectively, with said master motor, and including a switch between said master motor and each governing motor, each of said shafts having a setting corresponding to a zero position of its set of valve-actuating members; and means arranged to cause the closing of said switches, respectively, if the respective shafts are in the several positions corresponding to the zero positions of their valve-actuating members, said switches being inoperative as regards any effect upon the corresponding governing motors after the latter have been energized.

7. In means for controlling the commencement of the operations of a plurality of water gas sets having valves for regulating the operation of said water gas sets, the combination of a master motor; a plurality of sets of valve-actuating members adapted to be connected operatively with the valves of the respective water gas sets, each set of valve-actuating members having a common manually adjustable shaft; motors severally governing the rotation of said shafts and hence the operation of the respective sets of valve-actuating members; means electrically connecting said governing motors, respectively, with said master motor, and including a switch between said master motor and each governing motor, each of said shafts having a setting corresponding to a zero position of its set of valve-actuating members; members rotatably secured to said shafts, respectively, and formed with peripherally-notched portions; and rollers secured to each switch and adapted to travel on the peripheries of said members, respectively, the construction being such that each roller drops into the notched portions of the periphery of the member associated therewith to close the switch when the associated shaft has been rotated to its zero-setting.

8. In means for controlling the commencement of the operations of a plurality of water gas sets having valves for regulating the operation of said water gas sets, the combination of a master motor; a plurality of sets of valve-actuating members adapted to be connected operatively with the valves of the respective water gas sets; motors severally governing the operation of said sets of valve-actuating members; a plurality of connected disks rotated by said master motor, the peripheries of said disks being notched in spaced angular relations; a series of rollers, one for each disk, adapted to ride upon the peripheries of the several disks, a set of mercury switches respectively secured to said rollers and adapted respectively to be closed when the rollers drop into the notched portions of the disk peripheries; a common manually adjustable shaft for each set of valve-actuating members adapted to be rotated by the motor governing said set of valve-actuating members; a peripherally-notched disk member rotatably secured to each shaft; a roller adapted to ride upon the periphery of the respective disk members; a mercury switch connected to said last-mentioned rollers, respectively, and adapted to be closed when the rollers drop into the respective notches, the closing of said last-mentioned switches being thus effected when the respective shafts have been rotated to settings corresponding with the respective zero positions of the sets of valve-actuating members associated with said shafts; and electrical conductors connecting said two sets of switches and said master and governing motors to complete the several circuits.

9. In means for controlling the commencement of the operations of a plurality of water gas sets having valves for regulating the operation of said water gas sets, the combination of a master motor; a plurality of sets of valve-actuating members adapted to be connected operatively with the valves of the respective water gas sets; motors severally governing the operation of said sets of valve-actuating members; a plurality of connected disks rotated by said master motor, the peripheries of said disks being formed each with a notch; means for adjustably setting each disk before they are rotatably connected together so that the notches thereof can be disposed in desired spaced angular relations; a series of rollers, one for each disk, adapted to ride upon the peripheries of the several disks; a set of mercury switches respectively secured to said rollers and adapted respectively to be closed when the rollers drop into the notched portions of the disk peripheries; a common manually adjustable shaft for each set of valve-actuating members; a ratchet wheel and related elements by which said shaft is rotated from its governing motor, a peripherally-notched rim member secured to said ratchet wheel; a roller adapted to ride upon the periphery of said rim member; a mercury switch connected to said last-mentioned roller and adapted to be closed when the roller drops into the notch, the position of said ratchet wheel at the closing of said last-mentioned switch corresponding to a zero position of the set of valve-actuating members associated with said ratchet wheel and said shaft; and electrical conductors connecting said two sets of switches and said master and governing motors to complete the several circuits.

Signed by me this 25 day of April, 1928.
JAMES H. GLEASON.

CERTIFICATE OF CORRECTION.

Patent No. 1,845,745.                     Granted February 16, 1932, to

JAMES H. GLEASON.

It is hereby certified that the above numbered patent was erroneously issued to the inventor, said "Gleason", whereas said patent should have been issued to The Gas Machinery Company, of Cleveland, Ohio, a corporation of Ohio, as assignee of the entire interest in said invention, as shown by the records of assignments in this office; and that the said Letters Patent should be read with this correction therein that the same may conform to the record of the case in the Patent Office.

Signed and sealed this 29th day of March, A. D. 1932.

(Seal)                                                      M. J. Moore,
                                                           Acting Commissioner of Patents.